United States Patent

Wu et al.

[11] Patent Number: 5,889,566
[45] Date of Patent: *Mar. 30, 1999

[54] MULTISTABLE CHOLESTERIC LIQUID CRYSTAL DEVICES DRIVEN BY WIDTH-DEPENDENT VOLTAGE PULSE

[75] Inventors: Bao-Gang Wu; Jianmi Gao, both of Richardson; Hongxi Zhou, Dallas; Yao-Dong Ma, Richardson, all of Tex.

[73] Assignee: Advanced Display Systems, Inc., Amarillo, Tex.

[*] Notice: The term of this patent shall not extend beyond the expiration date of Pat. No. 5,625,477.

[21] Appl. No.: 837,431

[22] Filed: Apr. 17, 1997

Related U.S. Application Data

[63] Continuation of Ser. No. 225,836, Apr. 11, 1994, Pat. No. 5,625,477.

[51] Int. Cl.$^6$ .................................................. G07F 1/1343
[52] U.S. Cl. .............................. 349/35; 349/175; 349/33; 345/98
[58] Field of Search ............................... 349/35, 175, 33; 345/98

[56] References Cited

U.S. PATENT DOCUMENTS

| | | | |
|---|---|---|---|
| 3,703,331 | 11/1972 | Goldmacher et al. | 350/160 LC |
| 3,730,607 | 5/1973 | Grabmaier et al. | 350/160 LC |
| 3,806,230 | 4/1974 | Haas | 350/160 LC |
| 4,333,708 | 6/1982 | Boyd et al. | 350/346 |
| 4,505,548 | 3/1985 | Berreman et al. | 350/346 |
| 5,046,830 | 9/1991 | Nakanowatari | 359/90 |
| 5,251,048 | 10/1993 | Doane et al. | 359/51 |
| 5,272,552 | 12/1993 | Yoshinaga et al. | 359/43 |

OTHER PUBLICATIONS

D.K. Yang and J.W. Doane, "Cholesteric Liquid Crystal/Polymer Gel Dispersions: Reflective Display Applications," SID 92 Digest, pp. 759–761.

J.W. Doane, D.K. Yang and Z. Yaniv, "Front–Lit Flat Panel Display from Polymer Stabilized Cholesteric Textures," Japan Display '92, pp. 73–76.

(List continued on next page.)

*Primary Examiner*—William L. Sikes
*Assistant Examiner*—Kenneth Parker

[57] ABSTRACT

A light modulating apparatus containing cholesteric liquid crystals capable of indefinite zero field retention of optical images, including full color and complete gray scale capability, is described. This invention is predicated on establishment of zero field multistable liquid crystal domains representing a continuous distribution of states ranging from the highly reflective planar to the light-scattering focal-conic structures. The zero field multistable domain structure stability is achieved by controlling solid surface-liquid crystal boundary interactions to provide essential equalization of the total system energy of each of the domain structures. This is the first time this equalization, and thus zero field multistability, has been achieved without the use of a polymer gel addition to create rigid polydomains in the liquid crystal mix. The establishment of a particular domain structure, and thus the degree of light reflection or scattering by individual display pixels, is controlled using either a single relatively long voltage pulse or a number of shorter duration successive voltage pulses. The zero field multistability achieved is remarkably stable against both mechanical shocks and thermal variations. Because these displays eliminate the need for backlighting and image refreshing energy input, they represent ultra low power consumption devices ideal for use with portable display systems. Because these displays also eliminate the need for polarizers, analyzers, retarder and color filters, they are ultra thin and particularly well suited for use in ultra large (i.e., billboard) displays using a building block approach which retains total spatial integrity. These displays can also be fabricated as flexible all-plastic units again utilizing the overall thinness of these devices.

87 Claims, 10 Drawing Sheets

OTHER PUBLICATIONS

Y.K. Fung, D.K. Yang, J.W. Doane and Z. Yaniv, "Projection Display from Polymer Stabilized Cholesteric Textures," The 13th International Display Research Conference (Aug. 31–Sep. 3, 1993), SID France.

D.K. Yang, L.C. Chien and J.W. Doane, "Cholesteric Liquid Crystal/Polymer Gel Dispersion Bistable at Zero Field," Conference Record, International Display Research Conference (Oct. 1993), p. 44, SID.

J.W. Doane, D.K. Yang and L.C. Chien, "Current Trends in Polymer Dispersed Liquid Crystals," 1991 IEEE, pp. 175–178.

MULTISTABLE CHOLESTERIC LIQUID CRYSTAL DEVICES DRIVEN BY WIDTH-DEPENDENT VOLTAGE PULSE

This application is a continuation, of application Ser. No. 08/255,836 filed on Apr. 11, 1994, now U.S. Pat. No. 5,625,477.

FIELD OF INVENTION

This invention involves construction of a liquid crystal containing device which provides long-term, high definition image storage, with full color and excellent gray scale capability, in the absence of applied electrical or magnetic fields.

BACKGROUND

Development of a liquid crystal based system which can provide optical modulation (e.g., image storage) under zero electrical or magnetic field conditions has been the subject of much research during the past twenty or so years. To qualify for use in this type of application, the liquids crystals must be capable of independent stable existence in at least two different molecular domain structural states under zero field conditions. To provide light modulation capability, the two different states must interact in a different manner with respect to incident electromagnetic radiation. Furthermore, the two states must be interconvertible via application of a suitable energy impulse if the system is to be employed as a medium for storage of variable data input on a continuing basis. The existence of the liquid crystals under zero field in two different conformations has been referred to as "bistability". An even more favorable situation would be one in which the liquid crystals could exist in a range of conformations under zero field conditions in which each conformation interacts to a different extent with incident electromagnetic radiation. This type of situation would be called multistability. Multistable behavior has the advantage that it would provide a range of light attenuation resulting in what is commonly called gray scale capability.

Starting with the early 1970's there have been a number of attempts to produce zero field bistable liquid crystal systems. Previous examples would include U.S. Pat. No. 3,703,331 to Goldmacker et al., issued Nov. 21, 1972, and U.S. Pat. No. 3,821,720 to Greubel et al., issued Jun. 28, 1974. Although both inventions describe liquid crystal systems which exhibit a level of bistability, the existence of this zero field bistability was only temporary. In fact, the more light scattering of the two states decayed slowly to a transmissive state when held under zero field conditions. Obviously a decay process of that type represents severe limitations in the use of such materials as a "storage" system. An additional drawback with these devices is that two distinctly different types of electrical signals are required to switch the liquid crystal structures back and forth between the two stable states.

U.S. Pat. No. 3,806,230 to Haas, issued Apr. 23, 1974, also describes a bistable liquid crystal system In this patent a cholesteric liquid crystal system is shown to exist in either a planar transmissive state or in a single mesophase focal-conic light scattering texture under zero field conditions. However, the zero field stability of both states exhibit an acknowledged marked time dependence as shown by data revealed in this patent For example, the liquid crystal texture identified as focal-conic shows an initial large increase in optical transmission during the first few minutes after removal of the electrical field with the transmission continuing to increase slowly with time thereafter. In fact, the focal-conic state is reported to have completely disappeared after approximately six hours under zero field conditions, again precluding use of such a system for long-term "storage" purposes. An additional practical limitation in this device is the relatively small difference in transmission reported between the two bistable states and this difference clearly decreases continuously under zero field conditions. In practical terms, this small difference in transmission corresponds to a poor initial contrast ratio which becomes progressively worse with time under zero field conditions. Finally, it is important to note that no gray scale capability is available with these systems as no intermediate zero field stabilities are reported (i.e., the system employed is not multistable).

A class of liquid crystal materials well known to exhibit bistability are those compounds known as ferroelectric liquid crystals (FLC). Examples of recent patents in which FLC devices are proposed for use to record information as a stored liquid crystal image, but not under zero field conditions, are U.S. Pat. No. 5,046,830 to Nakanowatari, issued Sep. 10, 1991, and U.S. Pat. No. 5,272,552 to Yoshimaga et al., issued Dec. 21, 1993. In common with all other FLC systems, these displays are limited to only two different field states (i.e., they are strictly bistable in nature) at a given applied voltage. This bistability is not stable under zero field conditions. The inherent availability of only two states eliminates gray scale capability with these FLC displays. Additional disadvantages of these systems are the requirements of the use of a polarizer and backlighting to obtain readability and sufficient contrast ratio under normal operating conditions.

U.S. Pat. No. 4,333,708 to Boyd et al., issued Jun. 8, 1982, describes a mechanically multistable liquid crystal cell based on liquid crystals specifically in the nematic mesophase structures. This display requires the use of polarizers and also requires dual frequency address modes to establish the bistability. A serious disadvantage of this display is the strong temperature dependence of the frequency addressing step. Although the patent title refers to multistability, this title is misleading as a given display exhibits only bistable behavior. To achieve the multistable states, a series of different displays, each having a particular surface boundary condition, must be constructed. Each of these individual displays would then exhibit a particular equilibrium liquid crystal domain of local energy minima. This does not provide true zero field multistability as provided in the present invention.

Another recent patent involving a zero field stable liquid crystal system is U.S. Pat. No. 5,251,048 to Doane et al., issued Oct. 5, 1993. This patent references long-term zero field bistability using a chiral nematic liquid crystal system. This bistability is predicated specifically on the presence of a polymer additive to the liquid crystal mix to create "polydomains of polymer network dispersed throughout the cholesteric liquid crystals". Additional publications dealing with this topic are the papers of Yang and Doane (1992), Doane et al. (1992), Fung et al. (1993) and Yang et al. (1991). The presence of this polymer additive not only increases the display complexity but, in fact, adversely affects key display physical properties. For example, as noted explicitly by Yang and Doane (1992), the polymer network used to create the polydomains scatters light which significantly lowers the optical transmission ratio (i.e., contrast ratio) attainable between the bistable states. The presence of this polymer network also functions to lower the response time and reduce the viewing angle of these displays.

At present, commercial applications requiring retention of liquid crystal images utilize primarily supertwist nematic (STN) or active matrix thin film transistor (AMTFT) technologies. Both of these approaches involve major disadvantages and limitations. For example, these displays require use of polarizers and other light attenuating components thus creating high power consumption backlighting requirements. This is a severe disadvantage in many applications as in operation of portable notebook type displays. The AMTFT displays are not true zero field image storage systems as they require a constant power input for image refreshing. The STN displays do not possess inherent gray scale capability as a result of the extreme steepness of the optical voltage response curve of the liquid crystals employed. Although gray scale can be achieved, it is obtained at the expense of display resolution by using, for example, four pixels instead of only one per area. Anywhere from one to four pixels are activated at a particular time to provide the gray scale effect. The AMTFT devices use semiconductors to provide memory effects and involve use of expensive, ultra high resistance liquid crystal materials to minimize RC losses. Additionally, these displays are both difficult and costly to produce and they are, at present, limited to relatively small size displays. Both STN and AMTFT systems require the use of filters to achieve full color capability, thus creating further light attenuation and increased backlighting needs.

SUMMARY OF THE INVENTION

The present invention provides the first successful example of a cholesteric liquid crystal based system which provides long-term (i.e., indefinite) image storage and gray scale capability under zero field conditions without having to employ polymer additives to the liquid crystals to create polydomain structures. Elimination of the polymer additive not only simplifies display construction but, more importantly, improves the important physical properties of these devices. Key features of this invention are the inherent gray scale capability, high contrast ratios, large viewing angle and high resolution, all of which are available under zero field conditions. In sharp contrast with current commercially available "storage" liquid crystal displays, the above properties are achieved without the use of polarizers, retarders, analyzers, backlighting or thin film transistors. A novel aspect of the current invention is that the display can be addressed using a sequence of short duration voltage pulses to provide both exceptional zero field gray scales and faster display response times.

BRIEF DESCRIPTION OF THE DRAWINGS

FIG. 1. A schematic illustration of domain structures in the cholesteric phase.

DETAILED DESCRIPTION OF THE INVENTION

Figure 1B:
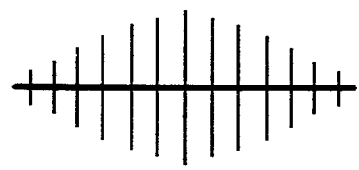
FIG. 1B illustrates the helical nature of each individual domain.
Figure 1A:
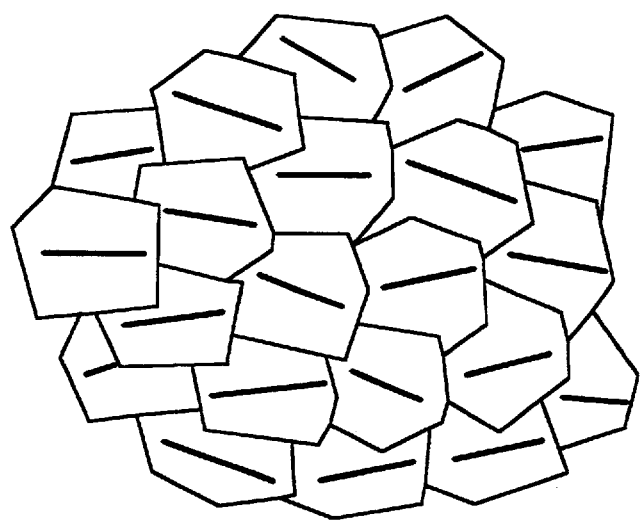
FIG. 1A shows the arrangement of planar domains with the helical axis directors in each domain indicated by the solid line.

The present invention utilizes liquid crystals in the cholesteric phase. The properties of such liquid crystals are well chronicled in various books, for example, Collings (1990). With respect to the present invention, the important property of cholesteric liquid crystals is their ability to exist in both reflective planar or in light scattering focal-conic structures. In the planar state, the liquid crystal molecules are arranged in domains with the long axes of the molecules roughly parallel to each other in each hypothetical layer. However, steric and asymmetry properties of the molecules result in a progressive slight displacement of the long axis of the molecules with respect to adjacent layer. The combined net effect of these small displacements is creation of a helical molecular structure in each domain. The helical axis is the director of the domain. FIG. 1 provides a schematic illustration of the planar cholesteric structure. FIG. 1A pictures a group of domains which form a planar texture. The dark line represents the helical axis which serves as the director of each domain. FIG. 1B is an illustration attempting to show the helical structure of a domain with the dark line again representing the helical axis. Electromagnetic radiation perpendicularly incident on these planar liquid crystal arrays is efficiently transmitted except for a relatively narrow wavelength band which is reflected. The wavelength of the reflected radiation is given by the relationship $\lambda=nP$ where n is the average refractive index and P is the pitch (i.e., twice the repetition length of the helical structure) of the liquid crystals. The reflected wavelength maximum is selectable by appropriate adjustment of the n and/or P values of the liquid crystal mixes employed If this wavelength maxima is outside the visible region of the electromagnetic spectrum (e.g., in the infrared), the planar cholesteric liquid crystal texture would be described as a transmissive state.

In contrast with either the visible reflective or IR transmissive states, the focal-conic state represents a scattering state as a maximum in the 2-D random orientation of the helical axis of the domains. This randomization provides an efficient scattering of incident electromagnetic radiation. If the thickness of the liquid crystal medium is sufficiently large, and the pitch and birefringence of the liquid crystals are satisfactory, the majority of incident visible radiation can be effectively scattered and the display appears to be milky white. If, however, the thickness of liquid crystal medium is relatively thin (e.g., less than 5 microns), only a small percentage of the incident radiation will be scattered with the remainder being transmitted. If the liquid crystal display has been assembled using a back plate liner which can strongly absorb visible radiation, the display will appear to be black when the liquid crystals are in a focal-conic phase. The present invention involves ultra thin displays and thus exhibit a black color when the liquid crystals are in the focal-conic domain orientation.

The major factor in the present invention is the discovery and demonstration that it is possible to produce cholesteric liquid crystal domain arrays which have a continuous distribution of states ranging from essentially planar to dominately focal-conic and most importantly, these intermediate states can be maintained indefinitely under zero field conditions. Furthermore, it has been discovered that a given domain orientation (i.e., anywhere from planar to focal-conic) can be established using either a single longer duration voltage pulse, or, more importantly, by a succession of very short voltage pulses. Upon removal of an applied voltage (i.e., zero field condition), the domain structures are maintained and are remarkably insensitive to mechanical shocks or reasonable temperature variations. Since the distribution of these domain directors are continuously variable, the display can be continuously changed from a reflective (or transmissive) state to one which is light scattering (i.e., focal-onic). The controlled variation of the distribution of these domain directors allows achievement of a continuous variability in the intensity of the reflected light from the display providing what is commonly known as gray scale capability (as shown below). Both full-color and gray scale capability are available with these devices by simple adjustment of the wavelength maxima for the reflective structure as described previously.

The discovery of this continuously variable distribution of cholesteric domains ranging from planar to focal-conic, all of which are stable under zero field conditions, we have labeled multistability to distinguish it from the numerous previous reports of bistabiliry behavior in liquid crystal systems. The key distinguishing feature of the present invention is attainment of this zero field multistability without recourse to addition of a polymer network additive to create polydomains, as was done in the previously cited papers of Doane et al. As documented below, elimination of the additive polymer network results in a display with significantly improved physical properties.

In the present case, the establishment of zero field multistability, obtained without polymer additives to the liquid crystal mix, is achieved by minimizing the attractive interactions (i.e., boundary effects) existent between the solid substrates and the liquid crystal domains. Typically these interactions result in establishment of a preferred liquid crystal domain texture (i.e., the lowest energy conformation) in the absence of any applied fields. For example, the slow zero field relaxation of focal-conic domains to planar domains in bistable cholesteric liquid crystals reported in U.S. Pat. Nos. 3,703,331, 3,821,780 and 3,806,230 is evidence of this solid surface-liquid crystal interactive driving force.

The key to success in the present invention has been establishment of solid surface-liquid crystal boundary conditions which reduce the free energy difference between the most stable lowest energy liquid crystal texture and the various other possible domain orientation. In effect, equalization of the free energy of the various domain orientations removes the strong driving force towards zero field relaxation of these materials to a ground state which is of significantly lower energy than other domain orientations. In this way, zero field multistability is established as the liquid crystal planar structure is of essentially the same energy as the focal-conic arrays and this energy equalization includes the intermediate domain structures spanning the planar to focal-conic extremes.

It is important to note that in typical liquid crystal displays a specific surface treatment is applied to the solid substrates to accentuate formation of a particular liquid crystal conformation under zero field conditions. This treatment involves application of a so-al led alignment layer to enhance the solid surface-liquid crystal interaction. The alignment layer is a thin film which has been rubbed or dipped unidirectional in an appropriate coating solution to provide a directional molecular orientation to the molecules in the alignment layer. The present invention eliminates all steps which would provide a directional orientation to the alignment layer. In this way, the zero field solid substrate-liquid crystal interactions result in homeotropic or homogeneous two-dimensional random domain structures and include a full range of tilt angle orientations between the liquid crystal molecules and the solid surfaces with all distributions having essentially the same energy. The small energy differences remaining between different domain orientations is insufficient to overcome the frictional forces between the domains. The application of an electrical field induces in the liquid crystals an adjustment in the domain structure dependent on the magnitude of the electrical field applied or on the number of short duration pulses employed. However, in contrast with previous work in this area, the liquid crystals remain frozen in the particular domain distributions when the field is turned off because the surface induced relaxation of these domains to a preferential lower system energy state (e.g., the Grandjean planar structure) encountered by previous workers has been eliminated The actual domain structure distribution present under zero field is dependent on the magnitude of the electrical field employed to originally establish a particular texture. Using either a single voltage pulse or a succession of very short duration voltage pulses, the helical axis domain directors can be sequentially moved from a perpendicular orientation to the solid surfaces to positions which are progressively more planar to these surfaces. Each intermediate state is stable under zero field conditions because the total system energy remains essentially the same regardless of the distribution of helical axis domain directors relative to the surfaces. In this way, gray scale capability is achieved under zero field conditions.

A major discovery in the present work has been demonstration that the zero field gray scale capability can be achieved using either a single voltage pulse or a succession of very short voltage pulses. Data obtained using both of these approaches is described below.

Figure 2:
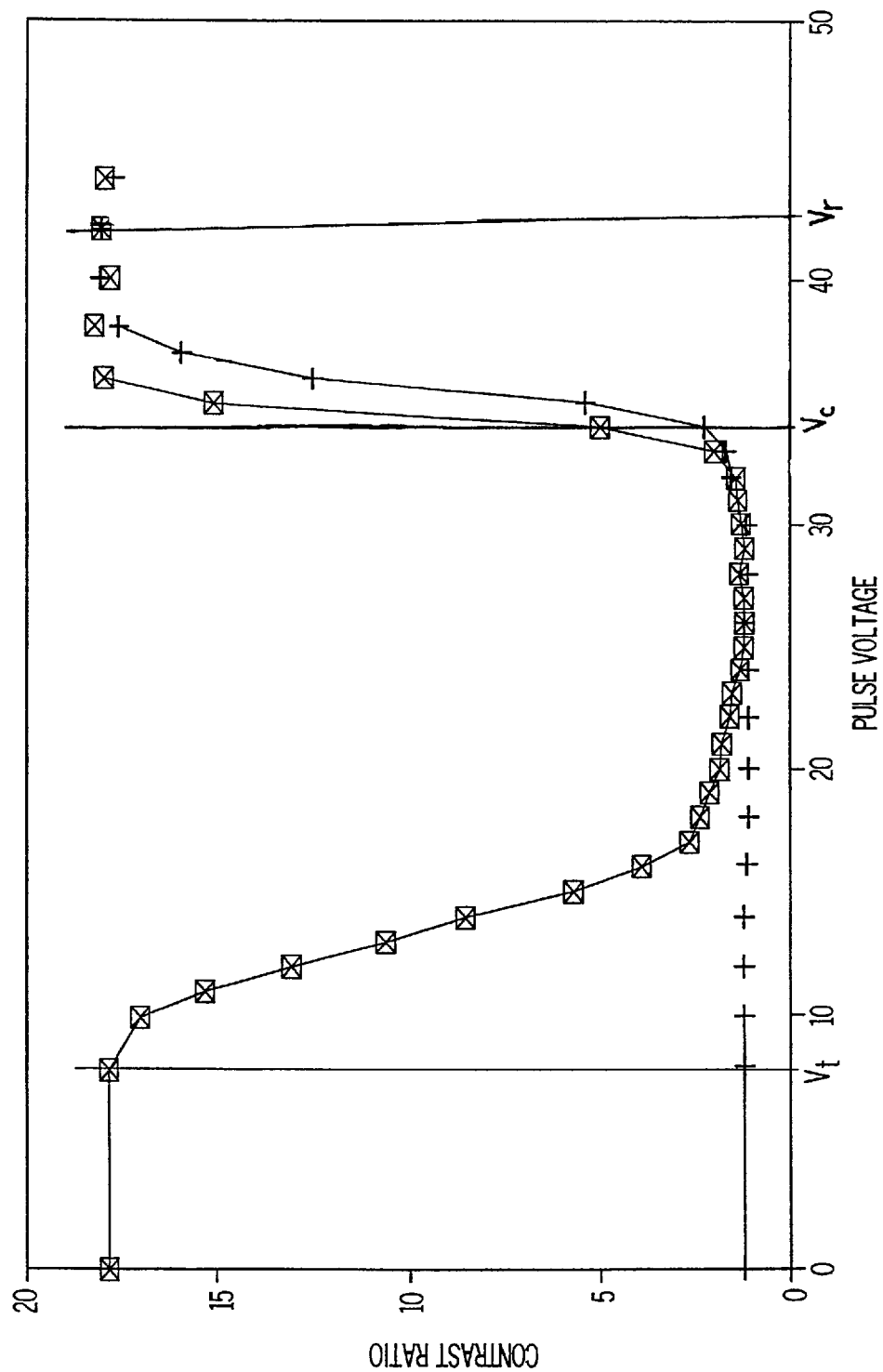
FIG. 2. Graph showing contrast ratio versus driver voltage for displays in initial reflecting domain structures (empty circles) and initial scattering domain structure (dark circles). The values of $V_T$, $V_C$ and $V_R$ for this system using a voltage pulse width of 75 ms are indicated on this graph.
Figure 3:
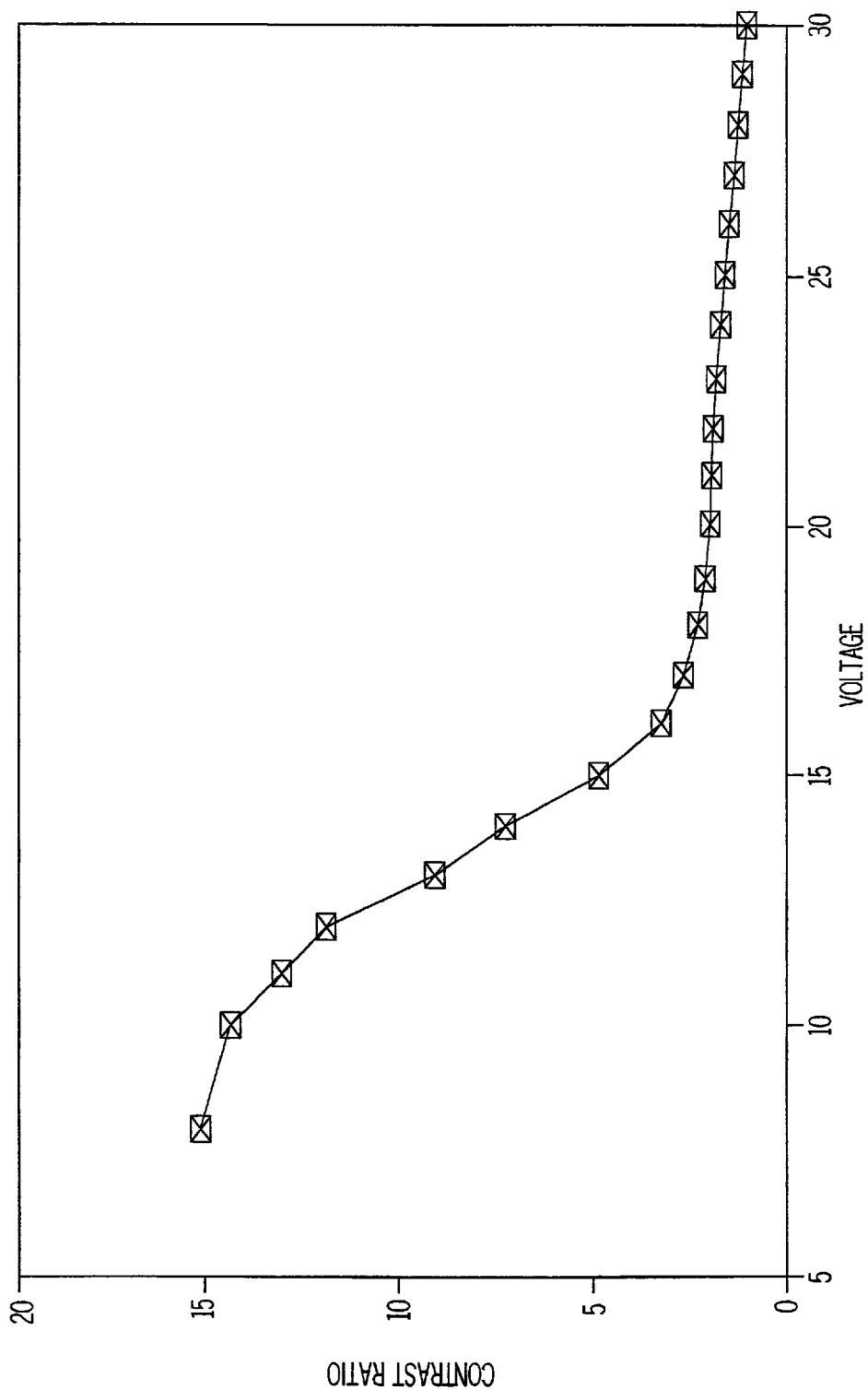
FIG. 3. Illustration of the variation in display contrast ratio achieved by application of variable pulse voltages to provide a continuous range of zero field stable liquid crystal domain structures. All contrast ratio measurements were made under zero field conditions, thus illustrating zero field gray scale capability.

FIGS. 2 and 3 provide experimental data which confirm the existence of zero field multistability obtained with a cholesteric liquid crystal mix using a single voltage pulse to establish domain textures. In both these figures, the contrast ratio of a cholesteric liquid crystal display is shown as a function of the pulse voltage employed to establish the various liquid crystal domain textures. What distinguishes these data- from all previous work in this field is that the contrast ratio measurements were made under zero field conditions.

The two curves in FIG. 2 represent contrast ratio measurements starting with a planar reflecting domain structure (empty circles) or a light scattering focal-conic structure (solid circles). After brief application of each voltage pulse, the contrast ratio was again measured, with this contrast ratio measurement being made under zero field conditions. As these data reveal, there is an apparent threshold voltage ($V_T$), in this case around 8 volts for the 75 ms voltage pulse employed, as indicated in FIG. 2. At voltage pulses above the threshold value, the liquid crystals are reoriented into progressively more light scattering and less reflective domain structures as shown by the decrease in contrast ratio with increasing pulse voltage. There is a progressive change in liquid crystal domain structures with changing pulse voltage culminating in a scattering focal-conic domain structure, at which point the contrast ratio is the same as that observed when starting with the liquid crystals in the focalonic array (i.e., the intersection point of the two curves). Finally, at higher applied voltage pulses (in this case above approximately 35 volts), the system is restored to the planar highly reflective state. The voltage pulse required to achieve the maximum zero field stable reflective state is referred to as $V_R$. At these higher applied voltages, the liquid crystals adopt a nematic structure by the end of the field on period but then relax quickly to the planar reflecting state when the voltage is released. $V_C$ is defined as the critical voltage required to induce a phase change from cholesteric to nematic. $V_S$ is defined as the driving voltage employed to establish domain structures intermediate between the planar and focalconic extremes. The value of $V_S$ is always intermediate between that of $V_T$ and $V_C$. Generally, in practice, a value of $V_S$ close to $V_C$ is employed for reasons outlined below.

FIG. 3 is an expanded view of the zero field contrast ratios obtained after momentary application of the switching voltage pulses shown along the abscissa starting from $V_T$ extending to higher driving voltages ($V_S$). This figure provides a clear example of the essentially continuous variation in liquid crystal domain structures that can be maintained under zero field conditions and the corresponding inherent gray scale capability associated with this zero field multistable behavior.

Figure 4:
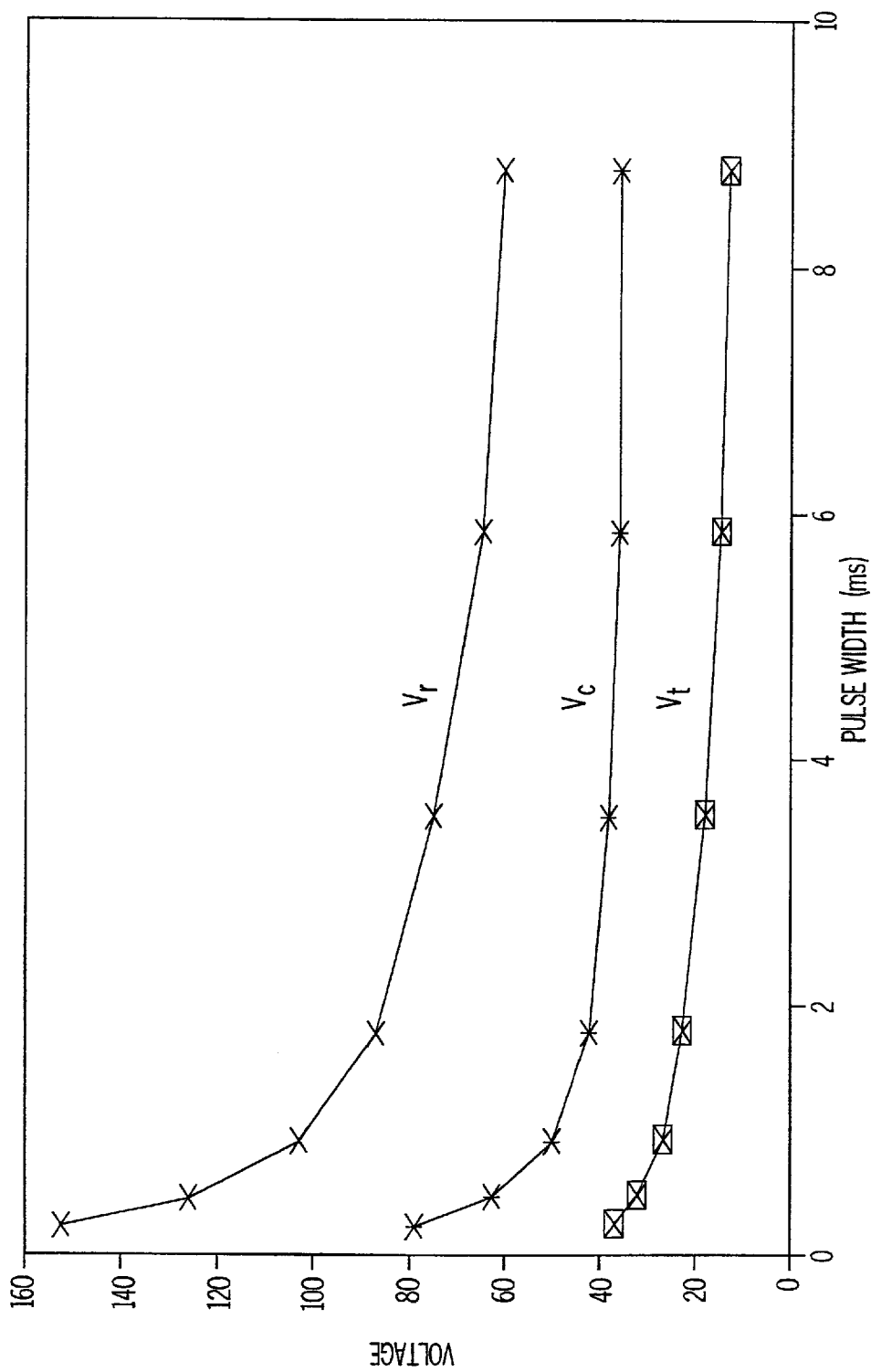
FIG. 4. Variation of $V_T$, $V_C$ and $V_R$ with voltage pulse width.
Figure 5A:
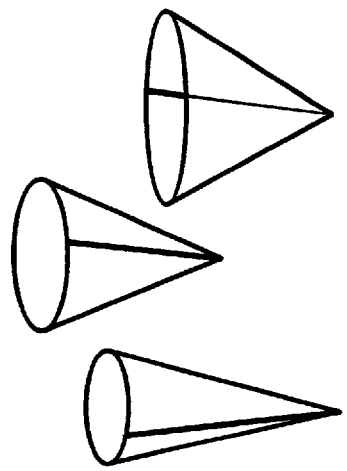
FIG. 5. Schematic illustration of the variation in domain directors with application of successive voltage pulses.
Figure 5B:
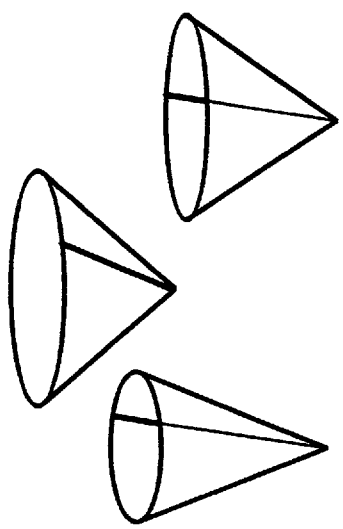
Figure 5C:
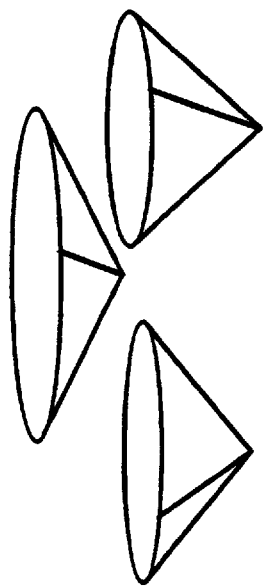
Figure 5D:

A major discovery in the present work is that $V_T$ (the threshold voltage) is in fact a function of the width of the voltage pulse applied to achieve the change in domain structures. Additionally, both $V_R$ and $V_C$, previously identified above, are also functions of voltage pulse widths for a given liquid crystal mix. FIG. 4 shows the variation in $V_T$, $V_C$ and $V_R$ obtained experimentally with a typical liquid crystal mixture. The pulse width dependencies of these voltages is a very significant discovery with respect to development of appropriate driver electronics for these zero field displays, as described below. Also $V_T$, $V_C$ and therefore $V_R$ depend on the relaxation time after the electric pulse.

Another important discovery with respect to these zero field stable domain structures is that a particular texture can also be slowly and controllably varied using a succession of very short duration pulses. With each successive pulse, a progressive change in the orientation of the helical axis domain directors relative to the solid surfaces is achieved. This progressive change can be realized starting with either the highly reflective planar structure and extending all the way to the focal-conic light scattering state or, conversely, starting with the focal-conic state and extending all the way to the planar structure. Of major significance is the fact that each intermediate state so established is perfectly stable under zero field conditions. FIG. 5 provides a schematic illustration of the sequential changes in the helical axis domain directors introduced by a succession of short duration voltage pulses. Structure A of FIG. 5 represents the planar reflective domain texture with the domain directors aligned in a relatively parallel fashion. Structure B of FIG. 5 is a representation of an intermediate arrangement of domain directors introduced by a single short duration voltage pulse whose voltage was greater than $V_T$ but less than $V_C$. As this diagram illustrates, there has been some net movement of the domain directors from their previously parallel orientation. A continued application of these short voltage pulses (each one of which is greater than $V_T$ and less than $V_C$) provides the progressive liquid crystal domain realignments shown in structures C and D of FIG. 5. Structure D shown would be representative of a focal-conic highly light scattering texture as illustrated by the random orientation of the molecular directors of the liquid crystals.

Figure 6A:
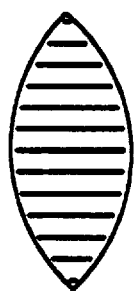
FIG. 6. Schematic illustration of molecular directors at applied voltage<$V_T$ (structure A); voltages between $V_T$ and $V_C$ (structure B); and voltages above $V_C$ (structure C).
Figure 6B:
Figure 6C:
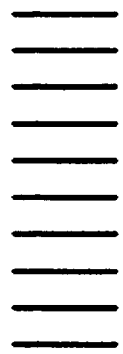

FIG. 6 is another schematic diagram which attempts to visualize the domain structural changes induced by the applied voltage pulses. Structure 6A represents a helical domain present during application of any voltage pulse less than $V_T$. Structure 6B illustrates application of a voltage pulse greater than $V_T$ but less than $V_C$. Although the overall helical domain structure is retained, this unit is somewhat elongated or distorted, particularly at the centers of the domains creating a longer pitch. Application of a voltage pulse greater than $V_C$ results in complete unraveling of the helical structure with formation of a nematic phase by the end of the pulse, as shown in structure 6C. However, removal of this >$V_C$ voltage pulse results in relaxation of the liquid crystals to helical domains with these domains arranged in a planar fashion to each other.

Figure 7:
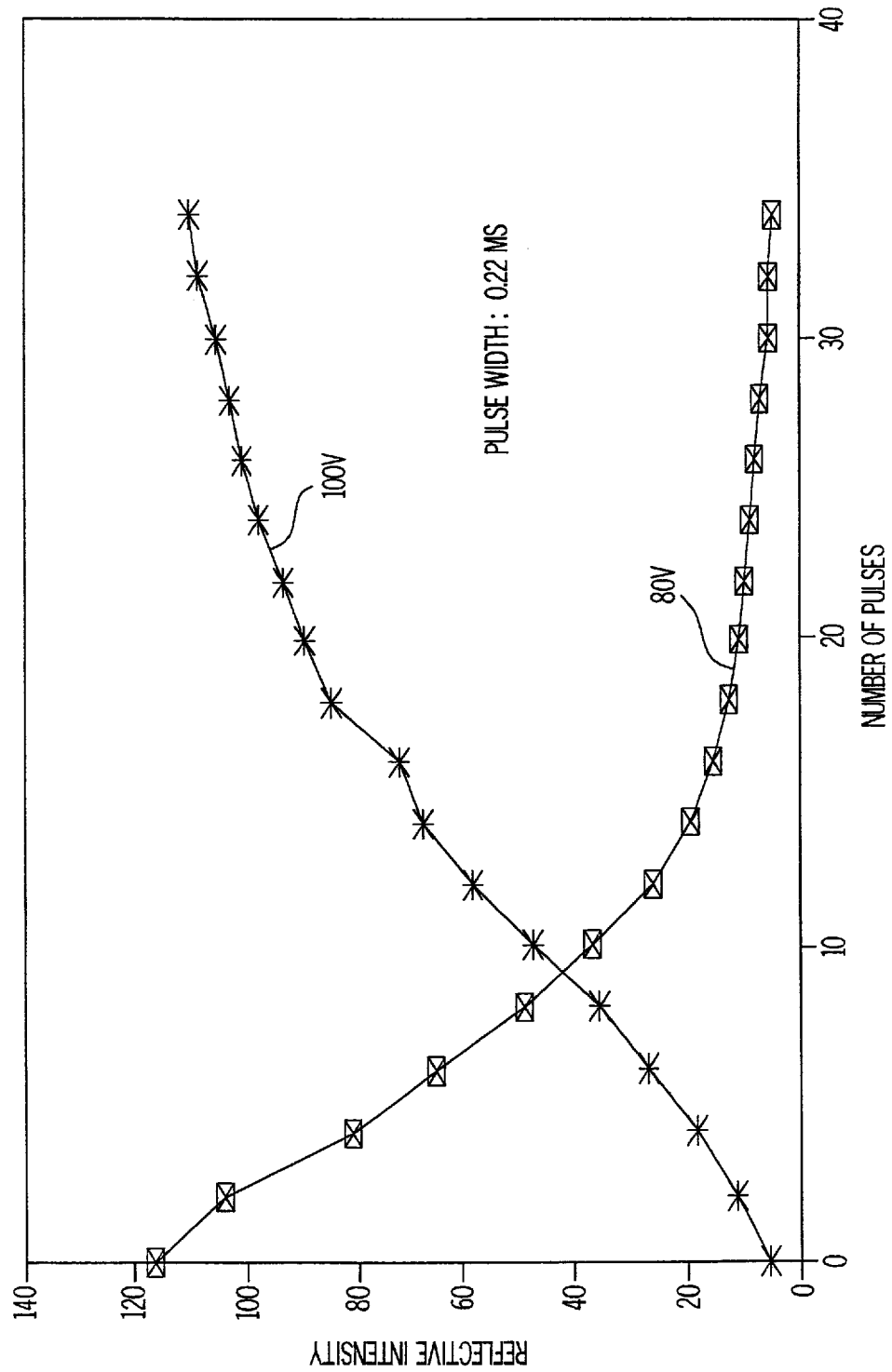
FIG. 7. Experimental data showing the establishment of zero field gray scales starting from either the reflective state (empty circles) or from the scattering state (dark circles). The former involves successive application of short driving pulses, each one of which was 80 V (i.e., below $V_C$) for 0.22 ms duration. The latter curve also involves 022 ms driving pulses, however, each pulse was of 100 V (i.e., above the $V_C$ value).

A major benefit of employing successive ultra short voltage pulses to achieve the liquid crystal realignments is that it permits exact control of the distribution of domain directors, thus providing exceptional gray scale capability. FIG. 7 provides direct experimental evidence of this gray scale capability. In this graph, the reflective intensity from a given set of pixels is plotted as a function of the number of successive short 0.22 ms duration 100 volt pulses which were applied The 100 volt pulse represents a voltage which is above the value of $V_C$ for a 0.22 ms pulse. As shown by the curve described by the dark circles in FIG. 7, a virtual linear relationship is obtained between the reflective intensity and the number of applied pulses. Furthermore, this change in reflective intensity covers a broad range of values. Again, it is important to note that these reflective intensity measurements were all made under zero field conditions.

It is, in fact, also possible to provide excellent zero field gray scale capability starting with the domains in the reflective planar phase using the repetitive short duration applied voltage pulse technique and slowly converting the domains to the light scattering focal-conic phase with each successive pulse. This transition can be achieved using a drive voltage which is less than $V_C$. FIG. 7 shows direct experimental data obtained using a ZLI-5400-100 liquid crystal mix with each 80 V drive voltage pulse applied for 0.22 ms duration. The curve described by the empty dots represents the transition from the planar to focal-conic domain structures with the linearity of the points describing the excellent zero field gray scale capability attainable with this system.

As those sdilled in the art of display technology will recognize, the availability of display operation using either a single pulse or a combination of short pulses permits operation of these displays in either analog or digital modes. This is a most significant factor in terms of utilization of this new technology.

Another important discovery associated with the use of repetitive higher voltage, short duration pulses to drive these displays is that this approach provides a faster overall display response time than achieved using a single long duration but lower voltage pulse. This is an extremely important finding in that it permits cholesteric liquid crystal mixes to be employed for applications requiring fast response times such as encountered in computer displays and in video systems.

The observation of the pulse width dependence of $V_T$, $V_C$ and $V_R$ is of particular value in designing efficient driver electronics for these zero field displays. For this purpose, a voltage $V_N$ is defined as:

$$V_N = (V_R - V_S)/2 < V_T$$

From this equation it is clear that the largest $V_R$ value which can be employed is defined by:

$$V_R < 2V_T + V_S$$

Figure 8:
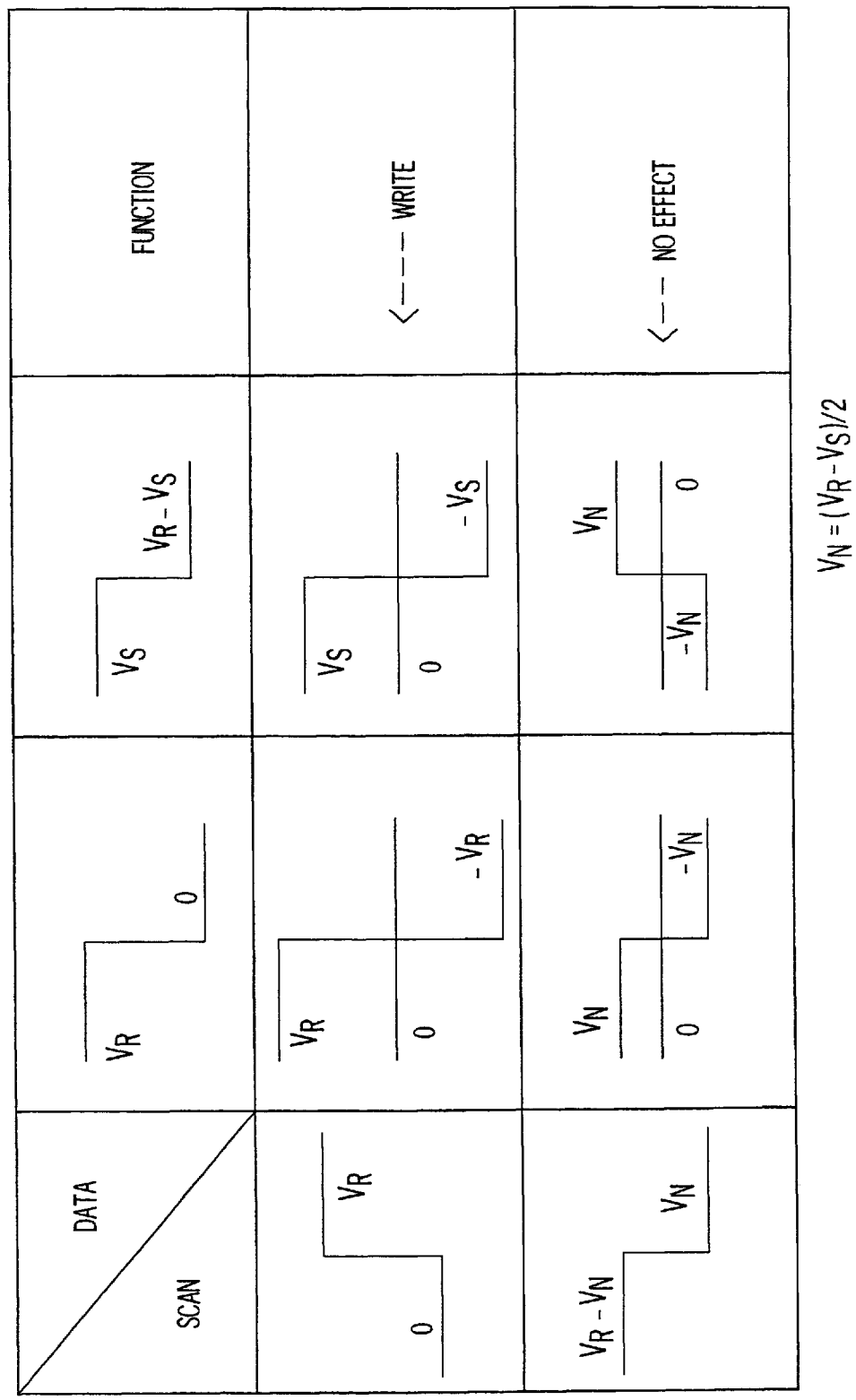
FIG. 8. Schematic illustration of the drive circuit logic for selective address of each individual pixel FIG. 9. Comparison of contrast ratio measurements for zero field multistable cholesteric displays with (empty circles) and without (dark circles) polymer additive. Contrast ratio measurements were made using a variable angle incident light and fixed observation point normal to the surface.

FIG. 8 provides a schematic illustration of the logic involved in addressing each individual pixel of these zero field storage displays. This diagram is arranged in the standard manner of data line input on top and scan lines varying from top to bottom The particular voltage inputs shown in FIG. 8 illustrate a method for selective addressing of each pixel. In this particular example, the first scan line is being actively addressed (i.e., it is the driver scan line). During this period, all of the pixels, except those in the first scan line, are maintained at $V_N$ (i.e., below the threshold voltage, $V_T$) by the combined scan line and data line voltage inputs, as shown in FIG. 8. At this time, each pixel in the first scan line is individually addressed by the scan line/data line combined voltages, an illustration of which is shown in FIG. 8. Furthermore, in light of the previous discussion, the individual pixel addressing can be achieved using either a single relatively long voltage pulse (cf. FIG. 3) or a succession of shorter voltage pulses (cf. FIG. 7). Upon completion of the first scan line address, the second scan line is activated as the driver scan line while all other scan lines (including the previously addressed first scan line) are held constant in such a manner that the combination of scan line/data line voltage inputs results in each pixel (other than those in the second scan line) being held at $V_N$ (i.e., below $V_T$, the threshold voltage). The second scan line pixels are then addressed in the same manner as described previously for the first scan line. This procedure would then be repeated in addressing the successive scan lines, thus providing the completed display image.

There are several other unique features of this zero field multistable cholesteric liquid crystal display technology which should be acknowledged explicitly. One particular advantage of this technology is that it is particularly well suited to construction of ultra large (i.e., billboard) size displays using a building block approach. In sharp contrast with other large displays so constructed, the zero field multistable displays can be assembled in a fashion which eliminates the boundary lines (i.e., discontinuities) characteristic of other ultra large displays. The advantage provided in the present displays is that a simple building block approach can be utilized to construct an ultra large display. A building block approach is suitable in the present case since the displays are unusually thin, thus providing for slight overlapping of each display segment without distortion of the spatial integrity of the image. The thinness of these zero field multistable displays arises from the fact that these units do not require use of polarizers, analyzers, color filters or backlighting components. Thus, an overlap procedure can be employed while retaining excellent overall picture quality.

A second unique aspect of these displays is the construction of flexible plastic units, including full-color displays. The elimination of the need for polarizers, analyzers, color filters, backlighting, etc. results in an unusually thin display. Flexible solid plastic ITO-coated substrates are employed in lieu of solid glass as the material to contain the liquid crystals. Again, unusually large displays can be made without having to be concerned with the fragile breakage problem encountered with glass. There are two ways in which this full-color capability can be achieved. In the first case, channels are inscribed in the substrate and these channels are alternately filled with cholesteric liquid crystals having wavelength maxima reflections in the red, green and blue (RGB) regions of the visible spectrum. In a second approach, full-color capability is achieved by overlapping of RGB layers.

A particularly advantageous use of this new zero field multistable cholesteric liquid crystal technology will be in the area of low power, high resolution displays. Because these displays eliminate the need for constant backlighting and image refreshing, they represent ultra low power consumption devices. This represents a very important advantage in many applications involving battery-operated systems in which backlighting and image refreshing power requirements result in a relatively short operational period before battery recharging is required. By eliminating backlighting and constant image refreshing needs, the zero field multistable displays of this invention will significantly extend uninterrupted use of battery-operated computers and other display devices.

The applications noted above have been cited merely as examples in which the zero field multistable display technology of the present invention will provide dramatic advances in display function and utilization. However, as those who are schooled in this art will recognize, there are numerous other applications in which zero field retention of display images is highly desirable. Examples would include store and supermarket pricing systems, highway signs, informational displays of all type, etc. All applications involving cholesteric liquid crystals for indefinite image retention under zero field conditions are also considered to fall under the purview of this invention.

The following represent a series of examples which illustrate various properties of these new zero field multistable displays and details of how such displays can be constructed.

EXAMPLE 1

A typical cholesteric liquid crystal display was fabricated using glass substrates coated with a conductive ITO layer and a layer of octadecyltrimethoxysilane ($C_{21}H_4O_3Si$). No rubbing or other alignment type procedure was applied to the silane coating. This cell was filled with a cholesteric liquid-crystal mix consisting of 84% 31 LV, 5.3% CB15, 5.3% CE2 and 5.3% R1011 with 4 micron glass spacers employed This display exhibited zero field multistability after being subjected to momentary voltage pulses ranging from 8 to over 40 volts. The zero field optical properties of this display were comparable to those shown in FIGS. 2 and 3.

EXAMPLE 2

A cell identical to that shown in Example 1 was constructed. This display was converted to a zero field state which was approximately half-way between the most reflective and least reflective extremes by application of a suitable voltage pulse of 13 volts. The reflectance intensity of this display under zero field conditions was monitored over a five-month period. No observable change in the reflectance properties of this display was observed over this time period.

EXAMPLE 3

A cell similar in structure to that described in Example 1 was constructed with the one difference that a polyimide layer was substituted for the octadecyltiimethoxysilane coating. A polyimide 7511L formulation was employed Again, excellent zero field multistability was achieved and maintained

EXAMPLE 4

Same as in Example 3, except that a polyimide A-2 formulation was employed as the ITO protective layer in lieu of the polyimide 7511L formulation. Again, zero field multistable domain structures were obtained.

EXAMPLE 5

A cholesteric liquid crystal cell was fabricated in which the liquid crystal formulation employed consisted of 80% 2222-100, 5.0% R1011 and 15% CB15. A polyimide 7511L coating was applied to the ITO coated substrates. The cell was assembled using 4 micron glass spacers. Again, zero field multistability was achieved as evidenced by excellent gray scale capability as shown by contrast ratio measurements comparable to those shown in FIGS. 2 and 3.

EXAMPLE 6

Figure 9:
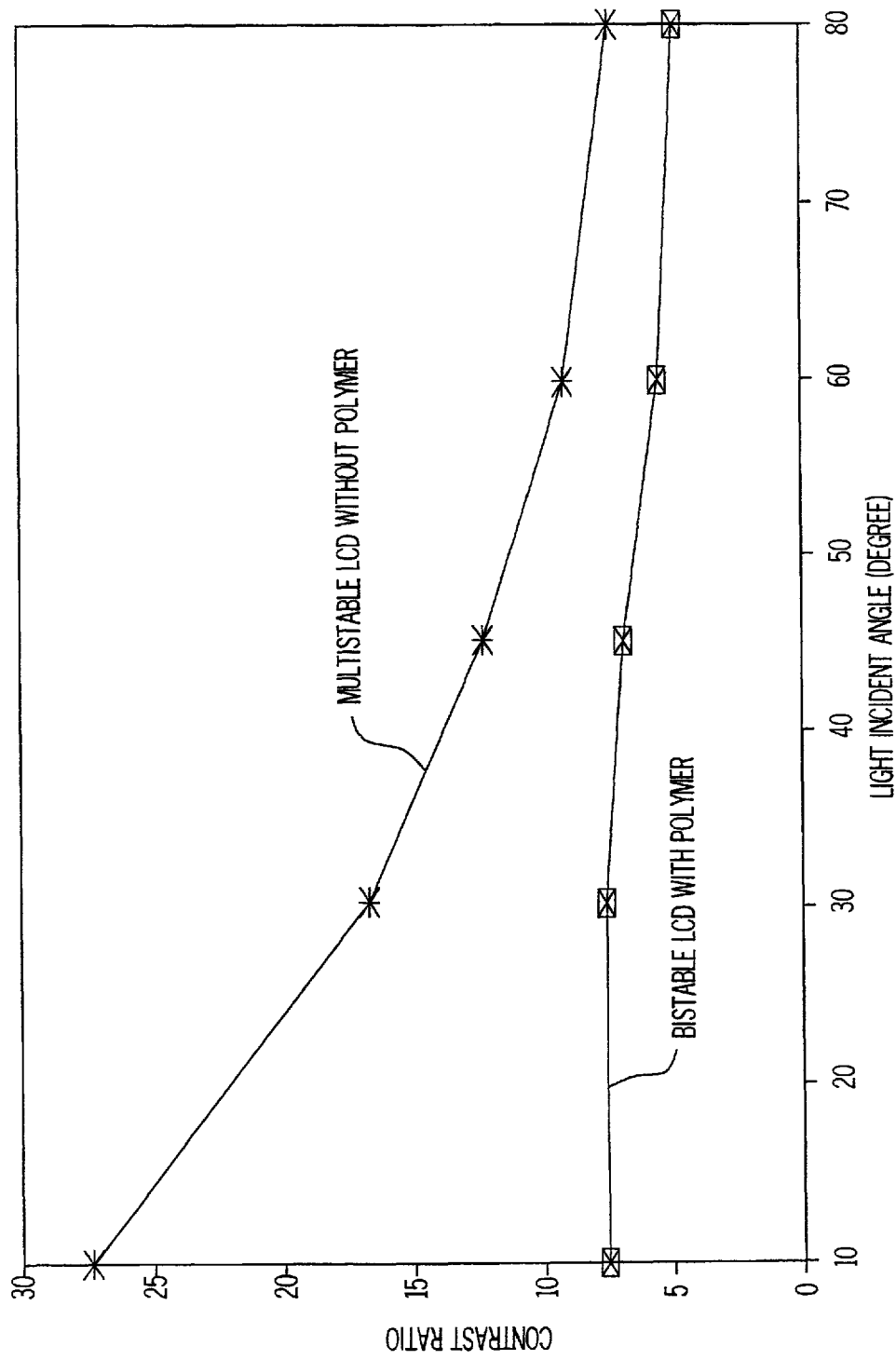
Figure 10:
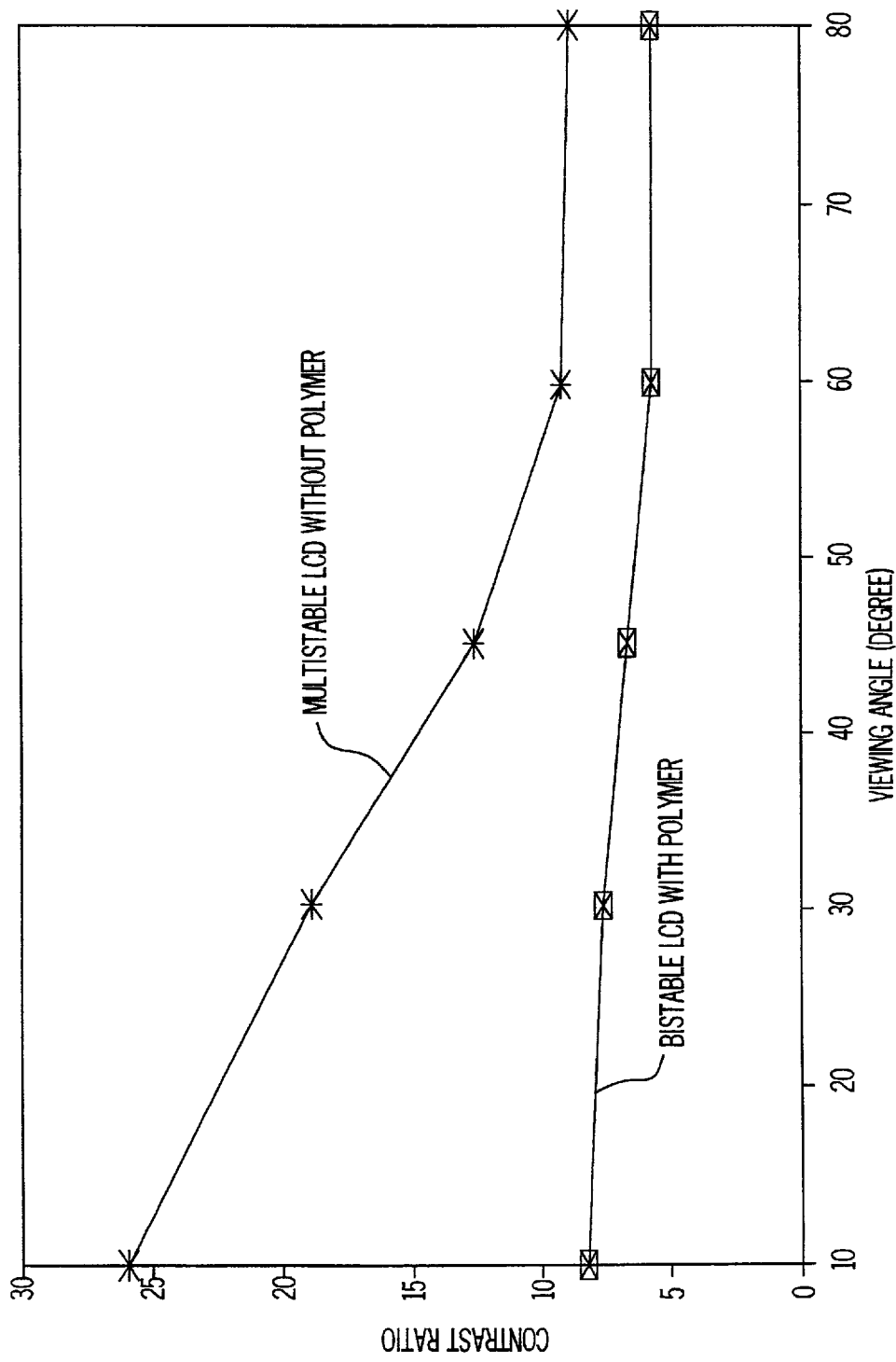
FIG. 10. Comparison of contrast ratios obtained using a fixed point incident light normal to the surface and a variable viewing angle for zero field multistable displays with (empty circles) and without (dark circles) polymer additive.

Two cholesteric liquid crystal displays were fabricated using identical liquid crystal formulations and solid surface treatments. The liquid crystal formulations employed were identical to those described in Example 5. The only difference in these two displays was the presence of a polymer additive to provide a network type structure of tiny liquid crystal domains as described in aforementioned references by Doane and co-workers. Both the polymer and non-polymer containing displays exhibited zero field multistable behavior. However, as shown in FIGS. 9 and 10, the optical properties of the non-polymer containing display are significantly better than the polymer containing device as revealed by measurement of the contrast ratio for these two systems. In FIG. 9, the contrast ratio was made using a variable angle incident light and a fixed observation point normal to the surface. In FIG. 10, a fixed point incident light normal to the surface and a variable viewing angle was employed. Precisely the same procedures and equipment were employed in both systems. The contrast ratios represent measurements made at the extremes of planar (i.e., most reflective) and focal-conic (i.e., most light scattering) liquid crystal textures. As these data reveal, elimination of the polymer additive results in a much improved contrast ratio, especially when the display is observed at normal viewing angles.

EXAMPLE 7

A cholesteric liquid display described in Example 1 operated at temperatures ranging from −15° to 83° C. The zero field multistability properties of this display were retained over this temperature range.

EXAMPLE 8

A display similar to that described in Example 1 was impressed with an image which was retained under zero field conditions. This image was retained when the display was subjected to a range of mechanical shocks typically to those which might be encountered during use (e.g., shaking, dropped on a table, etc.). In each case, zero field image retention was maintained.

REFERENCES CITED

| | | | |
|---|---|---|---|
| 3,703,331 | November 1972 | Goldmacher, et al. | 359/51 |
| 3,730,607 | May 1973 | Grabmeier et al. | 359/101 |
| 3,806,230 | April 1974 | Haas | 359/101 |
| 4,333,708 | June 1982 | Boyd, et al. | 359/101 |
| 5,046,830 | September 1991 | Nakanowatari | 359/101 |
| 5,251,048 | October 1993 | Doane, et al. | 359/101 |
| 5,272,552 | December 1993 | Yoshimaga, et al. | 359/101 |

Other Publications

D. K. Yang and J. W. Doane, "Cholesteric Liquid Crystal/Polymer Gel Dispersions: Reflective Display Applications," *SID* 92 Digest, pp. 759–761.

J. W. Doane, D. K. Yang and Z. Yaniv, "Front-Lit Flat Panel Display from Polymer Stabilized Cholesteric Textures," *Japan Display* '92, pp. 73–76.

Y. K. Fung, D. K. Yang, J. W. Doane and Z. Yaniv, "Projection Display from Polymer Stabilized Cholesteric Textures," *The 13th International Display Research Conference* (Aug. 31–Sep. 3, 1993), SID France.

D. K. Yang, L. C. Chien and J. W. Doane, "Cholesteric Liquid Crystal/Polymer Gel Dispersion Bistable at Zero Field," *Conference Record, International Display Research Conference* (October 1993), p. 44, SID.

P. Collings, "Liquid Crystals," Princeton University Press (1990).

What is claimed is:

1. A liquid crystal device comprising:
   a first solid substrate having a first inner surface coated with a first conductive layer;
   a second solid substrate having a second inner surface coated with a second conductive layer; and
   a substantially indefinite zero field multistable cholesteric liquid crystal mix located in a space between the first inner surface of the first solid substrate and the second inner surface of the second solid substrate, the liquid crystal mix comprising at least one liquid crystal and at least one twist agent forming multiple cholesteric domains, wherein each of the multiple cholesteric domains is a visible or near-visible reflective unit, wherein an orientation of each of the multiple cholesteric domains can be changed by application of a driving voltage, and wherein the driving voltage is a function of the width of a voltage pulse.

2. The liquid crystal device of claim 1, wherein the first conductive layer is coated with a first amorphous boundary layer.

3. The liquid crystal device of claim 2, wherein the first amorphous boundary layer comprises a polyimide.

4. The liquid crystal device of claim 2, wherein the first amorphous boundary layer comprises a silane.

5. The liquid crystal device of claim 2, wherein the first amorphous boundary layer is in a random relationship with the liquid crystals in a planar direction.

6. The liquid crystal device of claim 1, wherein the second conductive layer is coated with a second amorphous boundary layer.

7. The liquid crystal device of claim 6, wherein the second amorphous boundary layer comprises a polyimide.

8. The liquid crystal device of claim 6, wherein the second amorphous boundary layer comprises a silane.

9. The liquid crystal device of claim 6, wherein the second amorphous boundary layer is in a random relationship with the liquid crystals in a planar direction.

10. The liquid crystal device of claim 1, wherein the liquid crystal mix is substantially free of polymer additive.

11. The liquid crystal device of claim 1, wherein removing the driving voltage across the liquid crystal material whereby the domain orientation is transformed from one state to a different state.

12. The liquid crystal device of claim 1, wherein the driving voltage is a single voltage pulse.

13. The liquid crystal device of claim 12, wherein the speed of changing the domain orientation of the liquid crystal material is dependent on both the height of the driving voltage and the width of the voltage pulse.

14. The liquid crystal device of claim 12, wherein the single voltage pulse allows achievement of an unlimited gray scale capability.

15. The liquid crystal device of claim 1, wherein the driving voltage is applied by means of a matrix drive method wherein:

$$V_N = (V_R - V_S)/2;$$

and
wherein $V_N$ is the minimum cross-talk voltage, $V_R$ is the voltage pulse required to achieve the maximum zero field stable reflective state, and $V_S$ is the driving voltage having a value intermediate between $V_T$ and $V_C$, and close to $V_C$, wherein $V_T$ is the threshold voltage and $V_C$ is the critical voltage required to induce a phase change from cholesteric to nematic.

16. The liquid crystal device of claim 15, wherein $V_N$ is smaller than $V_T$, and wherein $V_T$ is the threshold voltage.

17. A liquid crystal device comprising:
a first solid substrate having a first inner surface coated with a first conductive layer;
a second solid substrate having a second inner surface coated with a second conductive layer; and
a substantially indefinite zero field multistable cholesteric liquid crystal mix located in a space between the first inner surface of the first solid substrate and the second inner surface of the second solid substrate, the liquid crystal mix comprising at least one liquid crystal and at least one twist agent forming multiple cholesteric domains, wherein each of the multiple cholesteric domains is a visible or near-visible reflective unit, wherein an orientation of each of the multiple cholesteric domains can be changed by application of a driving voltage comprising a succession of pulses.

18. The liquid crystal device of claim 17, wherein the succession of pulses allows an unlimited gray scale capability.

19. A liquid crystal device comprising:
a first solid substrate having a first inner surface coated with a first conductive layer;
a second solid substrate having a second inner surface coated with a second conductive layer; and
a substantially indefinite zero field multistable cholesteric liquid crystal mix located in a space between the first inner surface of the first solid substrate and the second inner surface of the second solid substrate, the liquid crystal mix being substantially free of polymer additive, the liquid crystal mix comprising at least one liquid crystal and at least one twist agent forming multiple cholesteric domains, wherein each of the multiple cholesteric domains is a visible or near-visible reflective unit, wherein an orientation of each of the multiple cholesteric domains can be changed by application of a driving voltage, and wherein the driving voltage is a function of the width of a voltage pulse.

20. The liquid crystal device of claim 19, wherein the first conductive layer is coated with a first amorphous boundary layer.

21. The liquid crystal device of claim 20, wherein the first amorphous boundary layer comprises a polyimide.

22. The liquid crystal device of claim 20, wherein the first amorphous boundary layer comprises a silane.

23. The liquid crystal device of claim 20, wherein the first amorphous boundary layer is in a random relationship with the liquid crystals in a planar direction.

24. The liquid crystal device of claim 19, wherein the second conductive layer is coated with a second amorphous boundary layer.

25. The liquid crystal device of claim 24, wherein the second amorphous boundary layer comprises a polyimide.

26. The liquid crystal device of claim 24, wherein the second amorphous boundary layer comprises a silane.

27. The liquid crystal device of claim 24, wherein the second amorphous boundary layer is in a random relationship with the liquid crystals in a planar direction.

28. The liquid crystal device of claim 19, wherein removing the driving voltage across the liquid crystal material causes the domain orientation to transform from one state to a different state.

29. The liquid crystal device of claim 19, wherein the driving voltage is a single voltage pulse.

30. The liquid crystal device of claim 29, wherein the single voltage pulse allows achievement of an unlimited gray scale capability.

31. The liquid crystal device of claim 19, wherein the driving voltage is applied by means of a matrix drive method wherein:

$$V_N = (V_R - V_S)/2;$$

and
wherein $V_N$ is the minimum cross-talk voltage, $V_R$ is the voltage pulse required to achieve the maximum zero field stable reflective state, and $V_S$ is the driving voltage having a value intermediate between $V_T$ and $V_C$, and close to $V_C$, wherein $V_T$ is the threshold voltage and $V_C$ is the critical voltage required to induce a phase change from cholesteric to nematic.

32. The liquid crystal device of claim 31, wherein $V_N$ is smaller than $V_T$, and wherein $V_T$ is the threshold voltage.

33. The liquid crystal device of claim 29, wherein the speed of changing the domain orientation of the liquid crystal material is dependent on both the height of the driving voltage and the width of the voltage pulse.

34. A liquid crystal device comprising:
a first solid substrate having a first inner surface coated with a first conductive layer;
a second solid substrate having a second inner surface coated with a second conductive layer; and
a substantially indefinite zero field multistable cholesteric liquid crystal mix located in a space between the first inner surface of the first solid substrate and the second inner surface of the second solid substrate, the liquid crystal mix being substantially free of polymer additive, the liquid crystal mix comprising at least one liquid crystal and at least one twist agent forming multiple cholesteric domains, wherein each of the multiple cholesteric domains is a visible or near-visible reflective unit, wherein an orientation of each of the multiple cholesteric domains can be changed by application of a driving voltage comprising a succession of pulses.

35. The liquid crystal device of claim 34, wherein the succession of pulses allows an unlimited gray scale capability.

36. A liquid crystal device comprising:
   a first solid substrate having a first inner surface coated with a first conductive layer;
   a second solid substrate having a second inner surface coated with a second conductive layer; and
   a substantially indefinite zero field multistable cholesteric liquid crystal mix located in a space between the first inner surface of the first solid substrate and the second inner surface of the second solid substrate, the liquid crystal mix comprising at least one liquid crystal and at least one twist agent forming multiple cholesteric domains, wherein each of the multiple cholesteric domains is a visible or near-visible reflective unit, wherein an orientation of each of the multiple cholesteric domains can be changed by application of a driving voltage, and wherein the driving voltage is a function of the width of a voltage pulse, wherein the driving voltage is applied by means of a matrix drive method wherein:

$$V_N = (V_R - V_S)/2;$$

and
wherein $V_N$ is the minimum cross-talk voltage, $V_R$ is the voltage pulse required to achieve the maximum zero field stable reflective state, and $V_S$ is the driving voltage having a value intermediate between $V_T$ and $V_C$, and close to $V_C$, wherein $V_T$ is the threshold voltage and $V_C$ is the critical voltage required to induce a phase change from cholesteric to nematic.

37. The liquid crystal device of claim 36, wherein $V_N$ is smaller than $V_T$, and wherein $V_T$ is the threshold voltage.

38. The liquid crystal device of claim 37, wherein the liquid crystal mix is substantially free of polymer additive.

39. A method of selectively addressing a pixel in a liquid crystal cell, the liquid crystal cell having a plurality of pixels arranged in a plurality of columns and a plurality of rows, the liquid crystal cell being capable of exhibiting substantially indefinite zero field multistable behavior, the method comprising:
   applying a first data line waveform or a second data line waveform to all pixels in at least one column of the plurality of columns;
   applying a first scan waveform to a row of pixels to be addressed;
   applying a second scan waveform to a remainder of the plurality of rows of pixels not to be addressed; and
   a combination of the first data line waveform and the first scan waveform causing the pixel to be addressed to achieve a reflecting state; a combination of the second data line waveform and the first scan waveform causing the pixel to be addressed to achieve a scattering state; either a combination of the first data line waveform and the second scan waveform or a combination of the second data line waveform and the second scan waveform being ineffective to cause the remainder of the plurality of pixels to achieve either the reflecting state or the scattering state.

40. The method of claim 39, wherein the combinations are achieved by subtraction.

41. The method of claim 40, wherein the subtraction results in alternating voltage.

42. The method of claim 39, wherein the first scan waveform comprises a polar square pulse having a first stage voltage of zero and a second stage voltage of $V_R$, wherein $V_R$ is the voltage pulse required to achieve the maximum zero field stable reflective state.

43. The method of claim 39, wherein the second scan waveform comprises a polar square pulse having a first stage voltage of $V_R - V_N$ and a second stage voltage of $V_N$, wherein $V_R$ is the voltage pulse required to achieve the maximum zero field stable reflective state and $V_N$ is the minimum cross-talk voltage.

44. The method of claim 39, wherein the first data line waveform comprises a polar square pulse having a first stage voltage of $V_R$ and a second stage voltage of zero, wherein $V_R$ is the voltage pulse required to achieve the maximum zero field stable reflective state.

45. The method of claim 39, wherein the second data line waveform comprises a polar square pulse having a first stage voltage of $V_S$ and a second stage voltage of $V_R - V_S$, wherein $V_R$ is the voltage pulse required to achieve the maximum zero field stable reflective state and $V_S$ is the driving voltage having a value intermediate between $V_T$ and $V_C$, and close to $V_C$, wherein $V_T$ is the threshold voltage and $V_C$ is the critical voltage required to induce a phase change from cholesteric to nematic.

46. The method of claim 39, wherein the combinations result in alternating voltage.

47. The method of claim 39, wherein the first data line waveform, or the second data line waveform, or both the first data line waveform and the second data line waveform are applied to all pixels of the plurality of columns.

48. The method of claim 39, wherein the method comprises a series of repeatedly addressing successive scan lines.

49. The method of claim 39, wherein the method comprises a single relatively long voltage pulse.

50. The method of claim 39, wherein the method comprises a succession of shorter voltage pulses.

51. A method of selectively addressing a pixel in a liquid crystal cell, the liquid crystal cell having a plurality of pixels arranged in a plurality of columns and a plurality or rows, the liquid crystal cell being capable of exhibiting substantially indefinite zero field multistable behavior, the method comprising:
   applying a first data line waveform or a second date line waveform to all pixels in at least one column of the plurality of columns, wherein the first data line waveform comprises a first polar square pulse having a first stage voltage of $V_R$ and a second stage voltage of zero, wherein the second data line waveform comprises a second polar square pulse having a first stage voltage of $V_S$ and a second stage voltage of $V_R - V_S$, wherein $V_R$ is the voltage pulse required to achieve the maximum zero field stable reflective state; and $V_S$ is the driving voltage having a value intermediate between $V_T$ and $V_C$, and close to $V_C$, wherein $V_T$ is the threshold voltage and $V_C$ is the critical voltage required to induce a phase change from cholesteric to nematic; applying a first scan waveform to a row or pixels to be addressed, wherein the first scan waveform comprises a third polar square pulse having a first stage voltage of zero and a second stage voltage of $V_R$, wherein $V_R$ is as above defined;

applying a second scan waveform to a remainder of the plurality of rows of pixels not to be addressed, wherein the second scan waveform comprises a fourth polar square pulse having a first stage voltage of $V_R-V_N$ and a second stage voltage of $V_N$, wherein $V_R$ is as above defined, and $V_N$ is a minimum cross-talk voltage; $V_T$ is as above defined; $V_N$ is lower than $V_T$ and being determined by subtracting a scan line voltage from a corresponding data line voltage; and, wherein subtracting the first scan waveform from the first data line waveform causes the pixel to be addressed to achieve a reflecting state with alternating voltage; subtracting the first scan waveform from the second data line waveform causes the pixel to be addressed to achieve a scattering state with alternating voltage; and either subtracting the second scan waveform from the first data line waveform or subtracting the second scan waveform from the second data line waveform is ineffective to cause the remainder of the plurality of pixels to achieve either the reflecting state with alternating voltage or the scattering state with alternating voltage.

52. The method of claim 51, wherein the method comprises a series of repeatedly addressing successive scan lines.

53. The method of claim 51, wherein the method comprises a single relatively long voltage pulse.

54. The method of claim 51, wherein the method comprises a succession of shorter voltage pulses.

55. A liquid crystal device comprising:
a first solid substrate having a first inner surface coated with a first conductive layer;
a second solid substrate having a second inner surface coated with a second conductive layer; and
a substantially indefinite zero field multistable cholesteric liquid crystal mix located in a space between the first inner surface of the first solid substrate and the second inner surface of the second solid substrate, the liquid crystal mix comprising at least one liquid crystal and at least one twist agent forming multiple cholesteric domains, wherein each of the multiple cholesteric domains is a visible or near-visible reflective unit; and
means to change the orientation of each of the multiple cholesteric domains, the means comprising:
applying a first data line waveform or a second data line waveform to all pixels in at least one column of the plurality of columns;
applying a first scan waveform to a row of pixels to be addressed;
applying a second scan waveform to a remainder of the plurality of rows of pixels not to be addressed; and
a combination of the first data line waveform and the first scan waveform causing the pixel to be addressed to achieve a reflecting state; a combination of the second data line waveform and the first scan waveform causing the pixel to be addressed to achieve a scattering state; either a combination of the first data line waveform and the second scan waveform, or a combination of the second data line waveform and the second scan waveform being ineffective to cause the remainder of the plurality of pixels to achieve either the reflecting state or the scattering state.

56. The liquid crystal device of claim 55, wherein the first conductive layer is coated with a first amorphous boundary layer.

57. The liquid crystal device of claim 56, wherein the first amorphous boundary layer comprises a polyimide.

58. The liquid crystal device of claim 56, wherein the first amorphous boundary layer comprises a silane.

59. The liquid crystal device of claim 56, wherein the first amorphous boundary layer is in a random relationship with the liquid crystals in a planar direction.

60. The liquid crystal device of claim 55, wherein the second conductive layer is coated with a second amorphous boundary layer.

61. The liquid crystal device of claim 60, wherein the second amorphous boundary layer comprises a polyimide.

62. The liquid crystal device of claim 60, wherein the second amorphous boundary layer comprises a silane.

63. The liquid crystal device of claim 60, wherein the second amorphous boundary layer is in a random relationship with the liquid crystals in a planar direction.

64. The liquid crystal device of claim 55, wherein the liquid crystal mix is substantially free of polymer additive.

65. The liquid crystal device of claim 55, wherein the combinations are achieved by subtraction.

66. The liquid crystal device of claim 65, wherein the subtraction results in an alternating voltage.

67. The liquid crystal device of claim 55, wherein the first scan waveform comprises a polar square pulse having a first stage voltage of zero and a second stage voltage of $V_R$, wherein $V_R$ is the voltage pulse required to achieve the maximum zero field stable reflective state.

68. The liquid crystal device of claim 55, wherein the second scan waveform comprises a polar square pulse having a first stage voltage of $V_R-V_N$ and a second stage voltage of $V_N$, wherein $V_R$ is the voltage pulse required to achieve the maximum zero field stable reflective state and $V_N$ is the minimum cross-talk voltage.

69. The liquid crystal device of claim 55, wherein the first data line waveform comprises a polar square pulse having a first stage voltage of $V_R$ and a second stage voltage of zero, wherein $V_R$ is the voltage pulse required to achieve the maximum zero field stable reflective state.

70. The liquid crystal device of claim 55, wherein the second data line waveform comprises a polar square pulse having a first stage voltage of $V_S$ and a second stage voltage of $V_R-V_S$, wherein $V_S$ is the driving voltage having a value intermediate between $V_T$ and $V_C$, and close to $V_C$, wherein $V_T$ is the threshold voltage and $V_C$, is the critical voltage required to induce a phase change from cholesteric to nematic and $V_R$ is the voltage pulse required to achieve the maximum zero field stable reflective state.

71. The liquid crystal device of claim 55, wherein the combinations result in alternating voltage.

72. The liquid crystal device of claim 55, wherein the means comprises a series of repeatedly addressing successive scan lines.

73. The liquid crystal device of claim 55, wherein the means comprises a single relatively long voltage pulse.

74. The liquid crystal device of claim 55, wherein the means comprises a succession of shorter voltage pulses.

75. A liquid crystal device comprising:
a first solid substrate having a first inner surface coated with a first conductive layer;
a second solid substrate having a second inner surface coated with a second conductive layer;
a substantially indefinite zero field multistable cholesteric liquid crystal mix located in a space between the first inner surface of the first solid substrate and the second inner surface of the second solid substrate, the liquid crystal mix comprising at least one liquid crystal and at least one twist agent forming multiple cholesteric domains, wherein each of the multiple cholesteric domains is a visible or near-visible reflective unit;

means to change the orientation of each of the multiple cholesteric domains, the means comprising:

applying a first data line waveform or a second date line waveform to all pixels in at least one column of the plurality of columns, wherein the first data line waveform comprises a first polar square pulse having a first stage voltage of $V_R$ and a second stage voltage of zero, wherein the second data line waveform comprises a second polar square pulse having a first stage voltage of $V_S$ and a second stage voltage of $V_R$–$V_S$ wherein $V_R$ is the voltage pulse required to achieve the maximum zero field stable reflective state; and $V_S$ is the driving voltage having a value intermediate between $V_T$ and $V_C$, and close to $V_C$, wherein $V_T$ is the threshold voltage and $V_C$ is the critical voltage required to induce a phase change from cholesteric to nematic;

applying a first scan waveform to a row or pixels to be addressed, wherein the first scan waveform comprises a third polar square pulse having a first stage voltage of zero and a second stage voltage of $V_R$, wherein $V_R$ is as above defined;

applying a second scan waveform to a remainder of the plurality of rows of pixels not to be addressed, wherein the second scan waveform comprises a fourth polar square pulse having a first stage voltage of $V_R$–$V_N$ and a second stage voltage of $V_N$, wherein $V_N$ is a minimum cross-talk voltage; $V_T$ is as above defined; $V_N$ is lower than $V_T$ and being determined by subtracting a scan line voltage from a corresponding data line voltage; and wherein subtracting the first scan waveform from the first data line waveform causes the pixel to be addressed to achieve a reflecting state with an alternating voltage; subtracting the first scan waveform from the second data line waveform causes the pixel to be addressed to achieve a scattering state with an alternating voltage; and either subtracting the second scan waveform from the first data line waveform or subtracting the second scan waveform from the second data line waveform is ineffective to cause the remainder of the plurality of pixels to achieve either the reflecting state with an alternating voltage or the scattering state with an alternating voltage.

76. The liquid crystal device of claim 75, wherein the first conductive layer is coated with a first amorphous boundary layer.

77. The liquid crystal device of claim 76, wherein the first amorphous boundary layer comprises a polyimide.

78. The liquid crystal device of claim 76, wherein the first amorphous boundary layer comprises a silane.

79. The liquid crystal device of claim 76, wherein the first amorphous boundary layer is in a random relationship with the liquid crystals in a planar direction.

80. The liquid crystal device of claim 75, wherein the second conductive layer is coated with a second amorphous boundary layer.

81. The liquid crystal device of claim 80, wherein the second amorphous boundary layer comprises a polyimide.

82. The liquid crystal device of claim 80, wherein the second amorphous boundary layer comprises a silane.

83. The liquid crystal device of claim 80, wherein the second amorphous boundary layer is in a random relationship with the liquid crystals in a planar direction.

84. The liquid crystal device of claim 75, wherein the liquid crystal mix is substantially free of polymer additive.

85. The liquid crystal device of claim 75, wherein the means comprises a series of repeatedly addressing successive scan lines.

86. The liquid crystal device of claim 75, wherein the means comprises a single relatively long voltage pulse.

87. The liquid crystal device of claim 75, wherein the means comprises a succession of shorter voltage pulses.

* * * * *